UNITED STATES PATENT OFFICE.

FRANCIS M. McCLENAHAN, OF OAKMONT, PENNSYLVANIA.

RECOVERY OF METALS FROM SILICATES.

1,426,890.  Specification of Letters Patent.  Patented Aug. 22, 1922.

No Drawing.  Application filed December 22, 1920.  Serial No. 432,518.

*To all whom it may concern:*

Be it known that I, FRANCIS M. Mc-CLENAHAN, a citizen of the United States, and a resident of Oakmont, in the county of Allegheny and State of Pennsylvania, have invented a new and useful Improvement in the Recovery of Metals from Silicates, of which the following is a specification.

The object of the invention is to provide an effective and practical process for economically recovering from aluminous silicates such as kaolin, feldspar, leucite, glauconite, etc., metals whose silico-fluorides or whose hydroxides are practically insoluble in an aqueous solution of ammonium-fluorides and ammonium-hydroxides.

In the practice of the invention, ground or otherwise pulverized silicate of aluminum, such as stated above, to which water is preferably added to form a pasty or semi-fluid mixture, is decomposed by the addition of a fluoride of ammonium in excess of that theoretically required to reduce the constituent elements to an aqueous solution of fluo-silicates containing hydrated oxide of aluminum as a precipitate. This decomposition is effected preferably at about the boiling temperature of the mixture. While the fluoride of ammonium may be neutral, basic or acid, it is, for technical and economic reasons explained hereinafter, preferred to use acid ammonium fluoride, commercially known as ammonium bi-fluoride. This decomposition of a silicate is, as far as some features of the invention are concerned, the characterizing step of the invention. The silicates require no treatment previous to their being mixed with the fluoride of ammonium, it being only necessary from a practical standpoint that they be sufficiently pulverized to permit them to be freely and rapidly decomposed. The further steps of the process have to do with the separation, from the digested mass, of the metals desired to be recovered, and also the recovery, for repeated use, of various materials used in the process.

The invention will be explained in detail in its applicability to the recovering of metal from feldspar, from which the adaptability of the invention to the treatment of other specific forms of aluminous silicates will be readily understood. In part, the decomposition of feldspar, and potassium aluminium silicate, by an excess of ammonium bi-fluoride may be expressed by the following chemical equation:

(1). $K_2O.Al_2O_3.6SiO_2 + 26NH_4F.HF = K_2SiF_6 + 2Al(OH)_3 + 5(NH_4)_2SiF_6 + 16NH_4F + 10H_2O.$

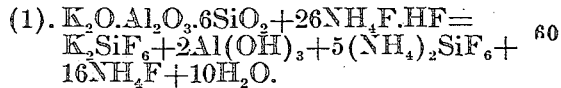

In explanation of the intermediate reactions which precede, or are incident to, the foregoing ultimate reaction, it is my belief that the aluminum fluo-silicate, as first formed, becomes hydrated oxide of aluminum, the following equation expressing such hydrolysis:

(2). $Al_2(SiF_6)_3 + 6H_2O = Al(OH)_3 + 3H_2SiF_6.$

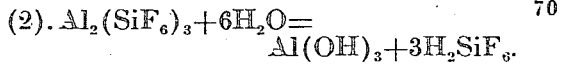

The fluo-silicic acid resulting from the reaction of the equation 2 is, according to the following equation 3, neutralized by ammonia which is tentatively formed in the manner indicated by equation 4.

(3). $3H_2SiF_6 + 6NH_3 = 3(NH_4)_2SiF_6.$
(4). $2NH_4F = NH_4F.HF + NH_3.$

From equation 3, it appears that an excess of ammonia is required. The decomposition of neutral ammonium-fluoride to the acid fluoride is not an explosive decomposition, but rather proceeds gradually in the aqueous solution as indicated by equation 4, which expresses a reversibility of the activity of the components.

As previously stated, an excess of ammonium bi-fluoride is preferably used in the decomposition of the silicates. Due to mass action, the excess ammonium bi-fluoride inhibits and prevents the escape of ammonia from the mixture, and thereby insures its remaining in or returning to the solution as ammonium fluoride ($NH_4F$). For example, I have found that the escape of ammonia may be prevented in a very practical manner by the addition of three times as much ammonium bi-fluoride as is required to affect the decomposition of the silicate. However, an excess less than that stated is sufficient to prevent the escape of ammonia from the system. One of the practical advantages here accruing is that it is not necessary to make provision for caring for ammonia vapor which would be evolved if an excess of ammonium bi-fluoride were not used.

If the silicate being treated is rich in potassium, this element will appear in the residue from the bi-fluoride digestion as the fluosilicate (silicofluoride), and may be extracted therefrom by means hereinafter described. In case it is desired to recover chiefly the alumina, and other metals are not present in sufficient proportions to render the aluminum unsuitable for its intended purpose, the digested mass may be filtered to remove the aluminum sludge including hydrated oxide of aluminum from it, and the filtrate may be treated to recover the ammonium bi-fluoride for effecting the decomposition of another batch of silicates. However, the usual run of silicates contains a number of metals in such proportions that it is desirable to so conduct the process that the several metals may be properly separated in substantially pure forms. It is to such end that the process is preferably practiced in the manner which will now be explained in such detail that it may be readily practiced by others.

As already stated, the hydrated oxide of aluminum of the digested mass expressed in the right hand portion of equation 1 is a precipitate in an otherwise aqueous solution of various salts, principally ammonium-fluoride and silico-fluoride salts. There are precipitated also the silico-fluorides of potassium and of other metals such as barium, if they are present in the silicate originally treated. However, the great bulk of the silicates go into solution in the form of fluo-silicates, principally ammonium fluosilicates.

In treating the digested mass so that the several metals contained in it may be subsequently separated, and also that the materials used in the process may be recovered and used repeatedly, advantage is taken of the fact that soluble fluo-silicates are decomposed by caustic alkalis and also by ammonium hydroxide producing metallic fluorides and silicic acid, the latter of which is precipitated as a white gelatinous substance, and that potassium and barium fluosilicates, not being to any great degree soluble in water, are not decomposed to any marked extent by ammonium hydroxide. Also, it is noted that, in the presence of ammonium fluoride, silicic acid is redissolved unless the re-solution is inhibited by the presence of basic ammonium hydroxide. Accordingly, ammonium hydroxide is added to the digested mass of equation 1 until the mixture give evidence of pronounced basicity. The mixture is then heated until it returns to a neutral condition, in which the silicic acid is completely re-dissolved and the insoluble hydrates of metal occurring in the original silicate, as well as the fluo-silicates of potassium and possibly barium, remain undissolved. By filtration and washing, the dissolved fluo-silicates and fluorides are separated from the undissolved hydrates and fluo-silicates. The filtrate is treated for the recovery of silicic acid and of ammonium bi-fluoride, the latter of which may be used for digesting further silicates and the residue treated for the recovery of aluminum and other metals whose silico-fluorides or whose hydroxides are practically insoluble in an aqueous solution of fluoride of ammonium or ammonium-hydroxide.

Having reference first to the filtrate, silica may be readily precipitated in it by making the filtrate alkaline with ammonium hydrate and filtering off the soluble ammonium fluoride from the insoluble silicic acid. The fluoride may, in the manner indicated in equation 4, be converted into ammonia and ammonium bi-fluoride, both of which may be returned to their proper places in the process, the ammonia as ammonium hydroxide in the last explained step of the process, the ammonium bi-fluoride being used again in the first step for digesting the further batch of silicate mineral. The silicic acid precipitated from the filtrate when dried, is found to be a finely divided form of meta-silicic acid which may be readily converted to sodium or potassium silicate, that is to say, water glass, or may be used for other commercial products requiring silica of high purity.

Referring to the residue resulting from the filtration of the digested mass, on account of the absorptive properties of aluminum hydrate, it is difficult to separate ammonium salts from the residue, and there will be held firmly attached thereto various combinations of ammonium-fluoride and ammonium silico-fluoride. These ammonium compounds may be driven from the precipitate or filtered mass by retorting it at a temperature which need not exceed 500° C., the residue consisting of oxides of iron, aluminum, manganese, etc., and silico-fluorides of potassium, barium, etc., or their inter-combinations. All the metallic oxides and the soluble fluorides of the residue are then passed into solution by digesting the residue with hydro-chloric acid. After digesting with hydro-chloric acid the mass is again filtered, the residue consisting of potassium silico-fluoride from which potassium sulphate may be recovered by treatment with concentrated sulphuric acid. The filtrate resulting from the digestion of hydrochloric acid is then evaporated nearly to dryness and the resultant crystalline mass is treated or washed with concentrated hydro-chloric acid.

By such washing with hydro-chloric acid, there is a residue of pure hydrated aluminum-chloride together with potassium-chloride and sodium-chloride, while all other chloride metals commonly occurring in silicates go into solution. The aluminum-chloride, potassium-chloride and sodium-chloride are then filtered from metallic salts held in solution. These chlorides are then retorted with the result that the chloride of aluminum is converted into alumina and hydrogen-chloride, and the two alkali chlorides remain unchanged. The hydrogen-chloride thus recovered may be used again in recovering a further batch of aluminum-chloride and alkali-chlorides from a mixture thereof. The alkali-chlorides may be recovered by leaching the ignited mass. After the separation of the aluminum and alkali-chlorides, the soluble chloride compounds of various metals may be evaporated to dryness and separated from each other in any desired manner in case such metals are present in sufficient quantities to render their recovery commercially practicable.

In the process as thus described, potassium salts alumina and silicic acid are recovered as valuable products in substantially pure form, and other metals present in the original mineral treated may also be recovered if present in large enough proportions. Aside from the recovery of these metals, it is characteristic of the process that the materials used in the various steps are recovered with little or no loss for repeated use. The process may be carried out by a succession of suitable vats, retorts, filters and condensers interconnected by suitable conduits, preferably in such a manner that flow will be effected by gravity except for the return of the recovered treating materials. The process, therefore, contemplates the consumption only of heat, the heat required being of inconsiderable value compared to that of the resulting products.

As previously stated, the characterizing step of the process is the digestion of the aluminous silicate by an excess of a fluoride of ammonium. While the remainder of the process may be variously conducted, it is preferred to practice it in the manner explained in detail, particularly when the original silicate contains various metals which would prevent the ready recovery of alumina and potassium salts in substantially pure forms.

I claim:

1. A step in the recovery of metals from silicates containing them, which consists in decomposing the silicates by an excess of a fluoride of ammonium solution.

2. A step in the recovery of alumina from aluminous silicates, which consists in decomposing the silicates by an excess of a fluoride of ammonium solution.

3. A step in the recovery of metals from silicates containing them, which consists in decomposing the silicates by an excess of ammonium bi-fluoride in the presence of water.

4. A step in the recovery of alumina from aluminous silicates, which consists in decomposing the silicates in the presence of water by an excess of ammonium bi-fluoride at about the boiling temperature of the mixture.

5. The process of recovering metals from silicates containing them which consists in decomposing the silicates by a fluoride of ammonium solution, treating the resulting mixture with ammonium hydroxide at an elevated temperature, separating the precipitate from the filtrate, and recovering fluoride of ammonium from the filtrate.

6. The process of recovering metals from silicates containing them, which consists in decomposing the silicates by an excess of ammonium bi-fluoride solution, separating the precipitate from the filtrate, and treating the filtrate for the recovery of silicic acid and of ammonium bi-fluoride.

7. The process of recovering metals from silicates containing them, which consists in decomposing the silicates by an excess of ammonium bi-fluoride solution, separating the precipitate from the filtrate, rendering the filtrate alkaline by the addition to it of ammonium hydrate, and separating the resulting soluble ammonium bi-fluoride from the insoluble silicic acid.

In testimony whereof, I have hereunto set my hand.

FRANCIS M. McCLENAHAN.

Witnesses:
 EDWIN O. JOHNS,
 PAUL N. CRITCHLOW.